(12) United States Patent
Imai

(10) Patent No.: US 11,347,224 B2
(45) Date of Patent: May 31, 2022

(54) SYSTEM AND METHOD TO CONTROL A TARGET OBJECT BASED ON A TRAVELING STATE OF A PERIPHERAL OBJECT

(71) Applicant: MITSUBISHI ELECTRIC CORPORATION, Tokyo (JP)

(72) Inventor: Yoshie Imai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 232 days.

(21) Appl. No.: 16/604,096

(22) PCT Filed: Jun. 1, 2017

(86) PCT No.: PCT/JP2017/020440
§ 371 (c)(1),
(2) Date: Oct. 9, 2019

(87) PCT Pub. No.: WO2018/220786
PCT Pub. Date: Dec. 6, 2018

(65) Prior Publication Data
US 2020/0159226 A1 May 21, 2020

(51) Int. Cl.
*G05D 1/02* (2020.01)

(52) U.S. Cl.
CPC ... *G05D 1/0212* (2013.01); *G05D 2201/0212* (2013.01); *G05D 2201/0213* (2013.01)

(58) Field of Classification Search
CPC ......... G05D 1/0212; G05D 2201/0212; G05D 2201/0213
See application file for complete search history.

(56) References Cited

U.S. PATENT DOCUMENTS 8,160,772 B2 * 4/2012 Ito ..................... G08G 1/09675
701/36
8,700,251 B1 * 4/2014 Zhu ..................... B60W 30/12
701/25
(Continued)

FOREIGN PATENT DOCUMENTS

DE   10 2006 038 018 A1    2/2008
DE   10 2013 012 324 A1    1/2015
(Continued)

OTHER PUBLICATIONS

International Search Report (PCT/ISA/210) issued in PCT/JP2017/020440, dated Aug. 15, 2017.
(Continued)

Primary Examiner — Ramsey Refai
(74) Attorney, Agent, or Firm — Birch, Stewart, Kolasch & Birch, LLP

(57) ABSTRACT

A peripheral data acquisition unit obtains peripheral data indicating a traveling state of a peripheral object traveling around a target object. A data writing unit stores the obtained peripheral data in a history storage unit in association with the position of the target object at the time when the peripheral data is obtained. A control specifying unit specifies a control method of the target object on the basis of, among the peripheral data stored in the history storage unit, the peripheral data stored in association with a current position of the target object.

11 Claims, 11 Drawing Sheets

(56) References Cited

U.S. PATENT DOCUMENTS

| | | | | |
|---|---|---|---|---|
| 2005/0131597 A1* | 6/2005 | Raz | .................. | G09B 19/167 |
| | | | | 701/29.1 |
| 2009/0037088 A1* | 2/2009 | Taguchi | .............. | B60W 30/095 |
| | | | | 701/117 |
| 2009/0167560 A1 | 7/2009 | Becker | | |
| 2012/0083960 A1* | 4/2012 | Zhu | .................. | B60T 17/18 |
| | | | | 701/23 |
| 2014/0236414 A1* | 8/2014 | Droz | .................. | G08G 1/166 |
| | | | | 701/28 |
| 2015/0032369 A1 | 1/2015 | Schmidt | | |
| 2016/0343254 A1* | 11/2016 | Rovik | .................. | G01J 1/0488 |
| 2016/0362118 A1* | 12/2016 | Mollicone | ............ | G05D 1/0276 |
| 2016/0363935 A1* | 12/2016 | Shuster | .................. | G08G 1/163 |
| 2020/0058218 A1* | 2/2020 | Julian | .................. | G08G 1/0125 |

FOREIGN PATENT DOCUMENTS

| | | |
|---|---|---|
| DE | 10 2013 019 196 A1 | 5/2015 |
| JP | 9-272414 A | 10/1997 |
| JP | 2002-127780 A | 5/2002 |
| JP | 2002-225587 A | 8/2002 |
| JP | 2003-58994 A | 2/2003 |
| JP | 2015-103070 A | 6/2015 |
| JP | WO 2015-183878 A | 11/2015 |
| JP | 2016-78730 a | 5/2016 |
| JP | 2016-224601 A | 12/2016 |
| KG | 3885500 B2 | 2/2007 |

OTHER PUBLICATIONS

German Office Action for German Application No. 112017007494.0, dated Jun. 16. 2020, with an English translation.

\* cited by examiner

Fig. 3

| POSITION | DATE | TIME | PERIPHERAL DATA 31 | |
|---|---|---|---|---|
| | | | SPEED | STEERING ANGLE |
| NORTH LATITUDE xx.xxx<br>EAST LONGITUDE xx.xxx | DAY: xx, MONTH: xx, YEAR: xxxx | xx:xx | xx Km | xx DEGREES |
| ... | ... | ... | ... | ... |

123

123

| POSITION | DATE | TIME | PERIPHERAL DATA 31 | | SURROUNDING CONDITIONS 32 |
| | | | SPEED | STEERING ANGLE | |
|---|---|---|---|---|---|
| NORTH LATITUDE xx.xxx<br>EAST LONGITUDE xx.xxx | DAY: xx, MONTH: xx, YEAR: xxxx | xx:xx | xx Km | xx DEGREES | xxx |
| ⋮ | ⋮ | ⋮ | ⋮ | ⋮ | ⋮ |

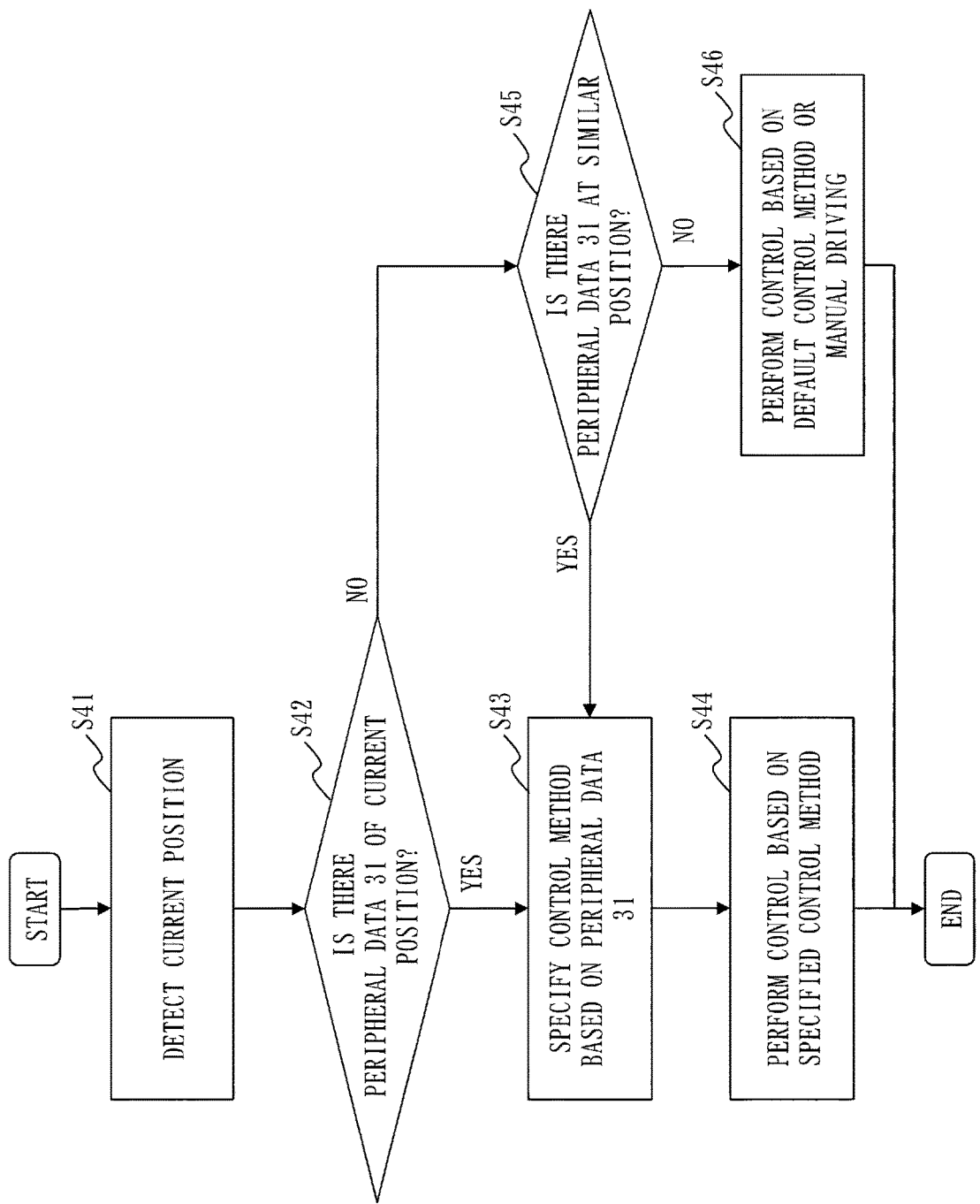

SYSTEM AND METHOD TO CONTROL A TARGET OBJECT BASED ON A TRAVELING STATE OF A PERIPHERAL OBJECT

TECHNICAL FIELD

The present invention relates to at least one of autonomous driving technology for controlling a mobile object on behalf of a driver or driving support technology for supporting driving of a driver.

BACKGROUND ART

Patent Literature 1 discloses that driving operation performed by a driver and a place where the driving operation is performed are recorded as operation history information, and autonomous driving control of a vehicle is performed at the recorded place on the basis the recorded driving operation. Patent Literature 1 thereby achieves autonomous driving that matches the drive sense of the driver.

CITATION LIST

Patent Literature

Patent Literature 1: WO 2015/166721 A

SUMMARY OF INVENTION

Technical Problem

A driving skill of a driver varies among individuals. In such a case where the driver is not used to driving, stable driving cannot be achieved if the autonomous driving control is performed on the basis of the operation history information of the driver. In addition, driving detached from that of vehicles traveling around will adversely affect the overall traveling. Therefore, if the autonomous driving control is performed on the basis of the operation history information of the driver, although it may match the driving sense of the driver, traffic congestion may be caused.

An object of the present invention is to enable proper traveling even in the case where a driver is not used to driving.

Solution to Problem

A mobile object controller according to the present invention includes:

a peripheral data acquisition unit to obtain peripheral data indicating a traveling state of a peripheral object traveling around a target object that is a mobile object;

a data writing unit to store, in association with a position of the target object at a time when the peripheral data is obtained, the peripheral data obtained by the peripheral data acquisition unit in a history storage unit; and a control specifying unit to specify a control method of the target object on a basis of, among the peripheral data stored in the history storage unit, the peripheral data stored in association with a current position of the target object.

Advantageous Effects of Invention

According to the present invention, a control method of an target object is specified on the basis of peripheral data indicating a traveling state of a peripheral object with respect to the current position of the target object. Accordingly, even in a case where a driver is not used to driving, it is possible to travel properly according to the traveling of the peripheral object that has traveled the point in the past.

BRIEF DESCRIPTION OF DRAWINGS

FIG. 3 is a table illustrating information to be stored in a history storage unit 123 according to the first embodiment.

FIG. 11 is a flowchart illustrating a traveling control process according to a seventh embodiment.

DESCRIPTION OF EMBODIMENTS

First Embodiment

* Description of Configuration *

Figure 1:
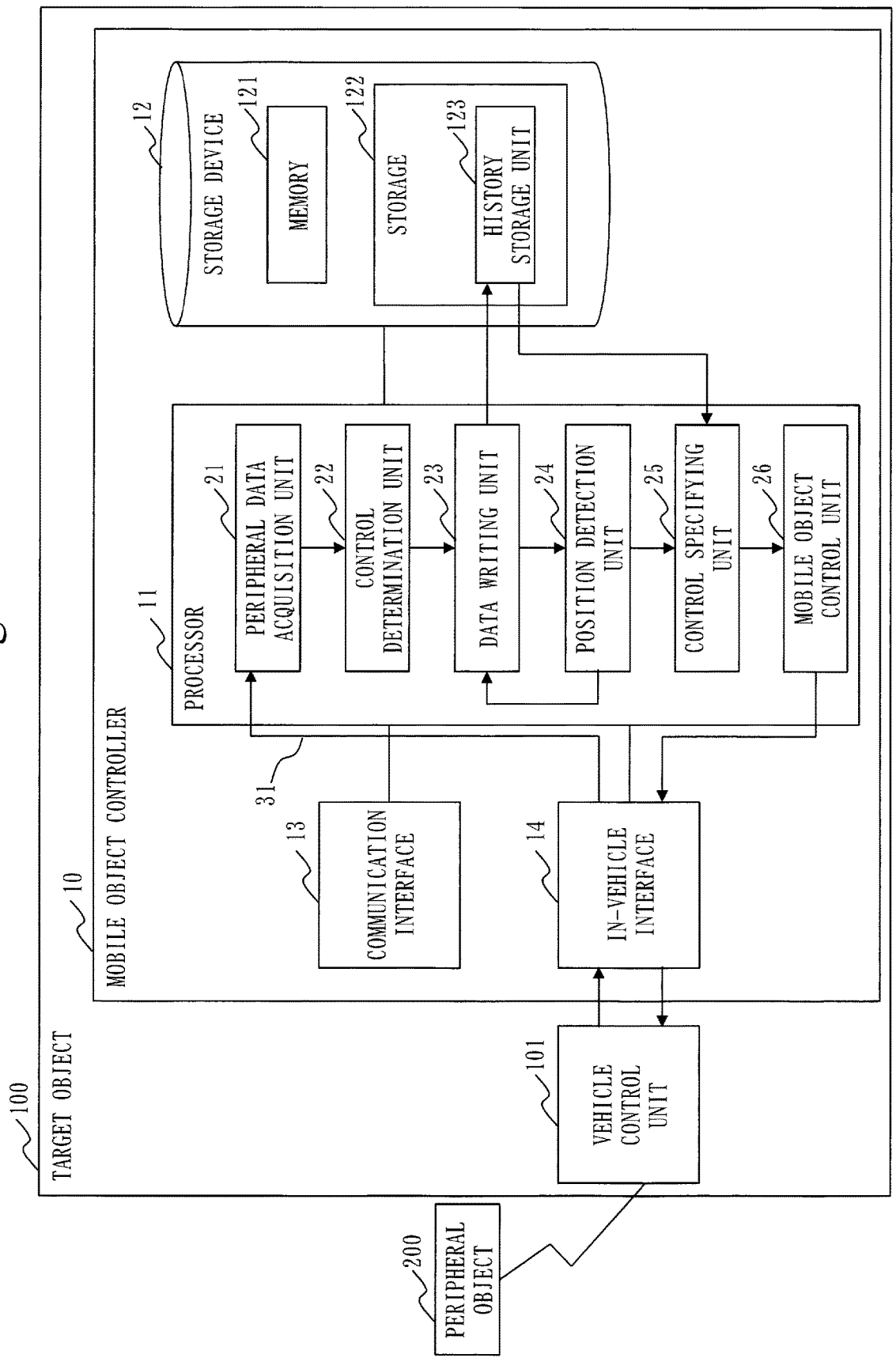
FIG. 1 is a configuration diagram of a mobile object controller 10 according to a first embodiment.

A configuration of a mobile object controller 10 according to a first embodiment will be described with reference to FIG. 1.

The mobile object controller 10 is a computer mounted on a target object 100 that is a mobile object. In the first embodiment, the target object 100 is described as a vehicle. However, the target object 100 may be of another type, such as a ship.

Note that the mobile object controller 10 may be implemented in an integrated or inseparable form, or in a detachable or separable form with/from the target object 100 or other components illustrated.

The mobile object controller 10 includes hardware of a processor 11, a storage device 12, a communication interface 13, and an in-vehicle interface 14. The processor 11 is connected to other pieces of hardware via a system bus to control those pieces of hardware.

The processor 11 is an integrated circuit (IC) that performs processing. Specific examples of the processor 11 include a central processing unit (CPU), a digital signal processor (DSP), and a graphics processing unit (GPU).

The storage device 12 includes a memory 121, and a storage 122. Specific examples of the memory 121 include a random access memory (RAM). Specific examples of the storage 122 include a hard disk drive (HDD). In addition, the storage 122 may be a portable recording medium, such as a Secure Digital (SD) memory card, a CompactFlash (CF), a NAND flash, a flexible disk, an optical disk, a compact disk, a Blu-ray (registered trademark) disk, and a DVD.

The communication interface 13 is a device for communicating with the outside, such as a peripheral object 200 that is a mobile object traveling around the target object 100.

Specific examples of the communication interface 13 include a terminal of a universal serial bus (USB) and Ethernet (registered trademark).

The in-vehicle interface 14 is a device for connecting to a vehicle control unit 101 mounted on the target object 100. Specific examples of the in-vehicle interface 14 include a terminal of USB, IEEE 1394, HDMI (registered trademark), and controller area network (CAN).

The vehicle control unit 101 is connected to a device of the target object 100, such as a camera, Light Detection and Ranging (LiDAR), laser radar, sonar, a positioning device, a steering, a brake, and an accelerator, which is a device that controls the target object 100.

The mobile object controller 10 includes, as functional components, a peripheral data acquisition unit 21, a control determination unit 22, a data writing unit 23, a position detection unit 24, a control specifying unit 25, and a mobile object control unit 26.

The function of each functional component of the mobile object controller 10 is implemented by software. The storage 122 of the storage device 12 stores a program for implementing the function of each functional component implemented by the software. The program is read and loaded into the memory 121 by the processor 11, and is executed by the processor 11.

In addition, the storage 122 implements the function of the history storage unit 123.

Only one processor 11 is illustrated in FIG. 1. However, a plurality of the processors 11 may be provided, and the plurality of processors 11 may cooperatively execute programs for implementing respective functions.

* Description of Operation *

Operation of the mobile object controller 10 according to the first embodiment will be described with reference to FIGS. 2 to 4.

The operation of the mobile object controller 10 according to the first embodiment corresponds to a control method of a mobile object according to the first embodiment. In addition, the operation of the mobile object controller 10 according to the first embodiment corresponds to processing of a mobile object control program according to the first embodiment.

The operation of the mobile object controller 10 according to the first embodiment includes a process of accumulating data, and a process of traveling control. The data accumulation process and the traveling control process are repeatedly executed in parallel during traveling or a pause of the target object 100.

The data accumulation process according to the first embodiment will be described with reference to FIG. 2.

(Step S11: Peripheral Data Acquisition Process)

The peripheral data acquisition unit 21 obtains peripheral data 31 indicating the traveling state of the peripheral object 200 traveling in the vicinity, for example, in front of the target object 100.

Specifically, the peripheral data acquisition unit 21 collects, via the vehicle control unit 101, information indicating a position and the like of the peripheral object 200 using a sensor such as a camera, LiDAR, a radar laser, and sonar. The peripheral data acquisition unit 21 repeatedly obtains information associated with the peripheral object 200, thereby obtaining the peripheral data 31 indicating the traveling state of the peripheral object 200. The peripheral data acquisition unit 21 writes the obtained peripheral data 31 in the memory 121.

At this time, the position detection unit 24 detects the position of the target object 100 at the time when the peripheral data 31 is obtained. Specifically, the position detection unit 24 obtains positional information output from the positioning device via the vehicle control unit 101. The positional information indicates the latitude and longitude of the target object 100. The position detection unit 24 writes the detected position of the target object 100 in the memory 121.

(Step S12: Control Determination Process)

The control determination unit 22 determines, from the peripheral data 31 obtained in step S11, whether or not the control level of the peripheral object 200 is higher than a reference value. The control level indicates a driving skill of a driver. That is, a high control level indicates that the driver is good at driving.

In a case where the control level is higher than the reference value, the control determination unit 22 proceeds to step S13 in the process. On the other hand, in a case where the control level is equal to or lower than the reference value, the control determination unit 22 terminates the process.

As a specific example, the control determination unit 22 calculates the distance between the target object 100 and the peripheral object 200 from the peripheral data 31, thereby estimating the driving speed of the peripheral object 200. Other factors of frequent changes in the driving speed may be external factors such as traffic congestion and may also be a low driving skill. Therefore, in a case where the frequency of changes in the driving speed of the peripheral object 200 is higher than a threshold value, the control determination unit 22 determines that the control level is equal to or lower than the reference value.

Further, as another specific example, the control determination unit 22 detects lighting of the brake lamp of the peripheral object 200. In the case where the brake lamp is lit frequently, it cannot be said that the driving is stably performed. Therefore, in a case where the frequency of lighting of the brake lamp of the peripheral object 200 is higher than a threshold value, the control determination unit 22 determines that the control level is equal to or lower than the reference value.

Further, as another specific example, the control determination unit 22 specifies the positional relationship between the peripheral object 200 and a road white line. Accordingly, the control determination unit 22 specifies whether or not the peripheral object 200 is traveling along the road without wobbles. In the case of wobbling, it cannot be said that the driving is stably performed. Therefore, in a case where the degree of wobbles of the peripheral object 200 is higher than a threshold value, the control determination unit 22 determines that the control level is equal to or lower than the reference value.

(Step S13: Data Writing Process)

The data writing unit 23 stores the peripheral data 31 obtained in step S11 in the history storage unit 123 in association with the position of the target object 100 at the time when the peripheral data 31 is obtained.

Specifically, the peripheral data 31 obtained in step S11 is written in the history storage unit 123 in association with the position of the target object 100 detected in step S11. In this case, as illustrated in FIG. 3, the data writing unit 23 writes a speed and a steering angle, which are the peripheral data 31, in the history storage unit 123 together with the date, time, and position of the target object 100 at the time when the peripheral data 31 is obtained. Note that the data writing unit 23 may write, as the peripheral data 31, brake information indicating a usage state of the brake, headlight information indicating a usage state of the headlight, and information associated with a size or the like of the peripheral object 200 in the history storage unit 123 in addition to the information illustrated in FIG. 3.

The traveling control process according to the first embodiment will be described with reference to FIG. 4.

(Step S21: Position Detection Process)

The position detection unit 24 detects the current position of the target object 100. Specifically, the position detection unit 24 obtains positional information output from the positioning device via the vehicle control unit 101. The position detection unit 24 writes the detected position of the target object 100 in the memory 121.

(Step S22: Data Search Process)

The control specifying unit 25 searches for, among the peripheral data 31 stored in the history storage unit 123, the peripheral data 31 stored in association with the current position of the target object 100 detected in step S21.

In the case where the control specifying unit 25 has found the peripheral data 31 stored in association with the current position of the target object 100, the process proceeds to step S23, On the other hand, in the case where the control specifying unit 25 has not found the peripheral data 31 stored in association with the current position of the target object 100, the process proceeds to step S25.

(Step S23: Control Specifying Process)

The control specifying unit 25 specifies a control method of the target object 100 on the basis of the peripheral data 31 found in step S22.

Specifically, in a case where the number of the found peripheral data 31 is one, the control specifying unit 25 specifies the speed and the steering angle indicated by the found peripheral data 31 as a control method. Further, in a case where a plurality of peripheral data 31 has been found, the control specifying unit 25 specifies, as a control method, an average value or a mode value of the speed and the steering angle indicated by the plurality of peripheral data 31 that has been found.

(Step S24: First Mobile Object Control Process)

The mobile object control unit 26 controls the target object 100 using the control method specified in step S23.

Specifically, the mobile object control unit 26 controls devices, such as a steering, a brake, and an accelerator, via the vehicle control unit 101 using the control method specified in step S23. At this time, the mobile object control unit 26 performs control such that smooth driving is achieved in consideration of the distance to other mobile objects in the vicinity, the speed of the other mobile objects in the vicinity, and the like.

Note that the mobile object control unit 26 may notify the driver of the target object 100 of the control method instead of controlling the target object 100. For example, the mobile object control unit 26 notifies the driver of the control method by displaying it on a display device mounted on the target object 100, outputting it as voice, or the like.

(Step S25: Second Mobile Object Control Process)

The mobile object control unit 26 controls the target object 100 using a default control method. The default control method is a method of performing control on the basis of a preset following-distance, speed, steering angle, and the like. Specifically, the mobile object control unit 26 controls devices, such as a steering, a brake, and an accelerator, via the vehicle control unit 101 using the default control method.

Alternatively, the mobile object control unit 26 causes the driver of the target object 100 to manually drive the target object 100.

Effects of First Embodiment

As described above, the mobile object controller 10 according to the first embodiment accumulates, as learning data of the control method at the position of the target object 100, the peripheral data 31 indicating the traveling state of the peripheral object 200 during traveling of the target object 100. Therefore, even in the case where the driver is not used to driving, the control method of the target object 100 is specified on the basis of the peripheral data 31, whereby it becomes possible to travel properly according to the traveling of the peripheral object 200 that has traveled the point in the past.

Furthermore, the mobile object controller 10 according to the first embodiment accumulates only the peripheral data 31 of the peripheral object 200 having the control level higher than the reference value as the learning data of the control method at the position. That is, the accumulated peripheral data 31 can be considered to represent the traveling state suitable for each position. Therefore, by specifying the control method of the target object 100 on the basis of the peripheral data 31, it is possible to perform control suitable for the position at which the target object 100 travels.

The control method may differ depending on the country or region in which the target object 100 travels. In view of the above, there may be a risk that control matching the traveling of peripheral mobile objects cannot be performed according to the default control method, which may cause traffic congestion. However, the mobile object controller 10 according to the first embodiment can perform control suitable for the position at which the target object 100 travels without performing extensive data collection or the like.

\*\*\* Other Configurations \*\*\*

<Variation 1>

In the first embodiment, each functional component is implemented by software. However, each functional component may be implemented by hardware as Variation 1. The differences between Variation 1 and the first embodiment will be described.

Figure 5:
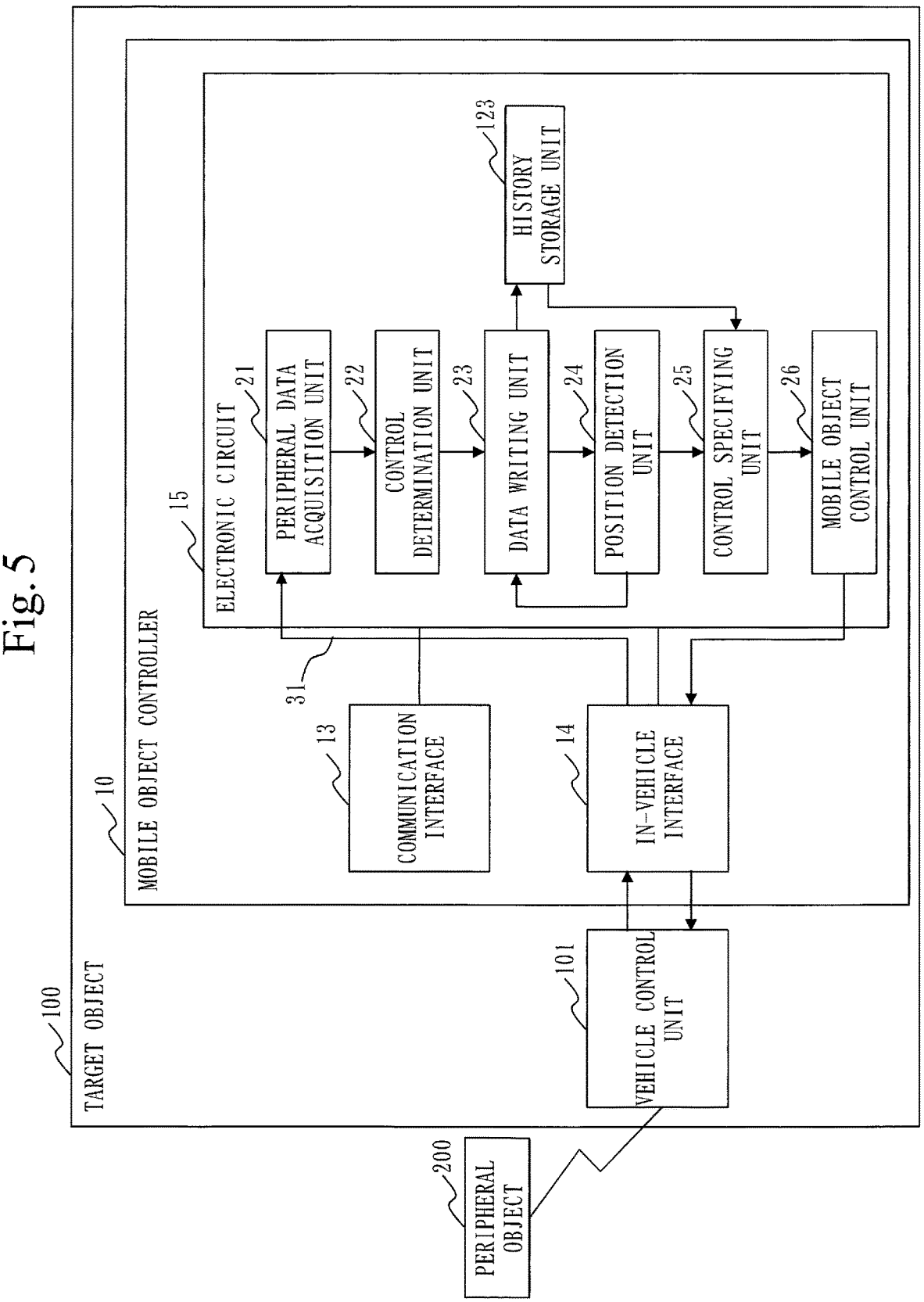
FIG. 5 is a configuration diagram of a mobile object controller 10 according to a Variation 2.

A configuration of the mobile object controller 10 according to Variation 1 will be described with reference to FIG. 5.

In a case where each functional component is implemented by hardware, the mobile object controller 10 includes an electronic circuit 15 instead of the processor 11 and the storage device 12. The electronic circuit 15 is a dedicated circuit that implements functions of each functional component and the storage device 12.

As the electronic circuit 15, a single circuit, a combined circuit, a programmed processor, a parallel programmed processor, a logic IC, a gate array (GA), an application specific integrated circuit (ASIC), and a field-programmable gate array (FPGA) are assumed.

Each functional component may be implemented by one electronic circuit 15, or each functional component may be distributed to a plurality of electronic circuits 15 and implemented.

<Variation 2>

Some of the functional components may be implemented by hardware, and the other functional components may be implemented by software as Variation 2.

The processor 11, the storage device 12, and the electronic circuit 15 are referred to as processing circuitry. That is, the function of each functional component is implemented by the processing circuitry.

Second Embodiment

A second embodiment is different from the first embodiment in that control suitable for surrounding conditions of an target object 100 is performed. The different points will be described in the second embodiment, and descriptions of the same points will be omitted.

* Description of Configuration *

Figure 6:
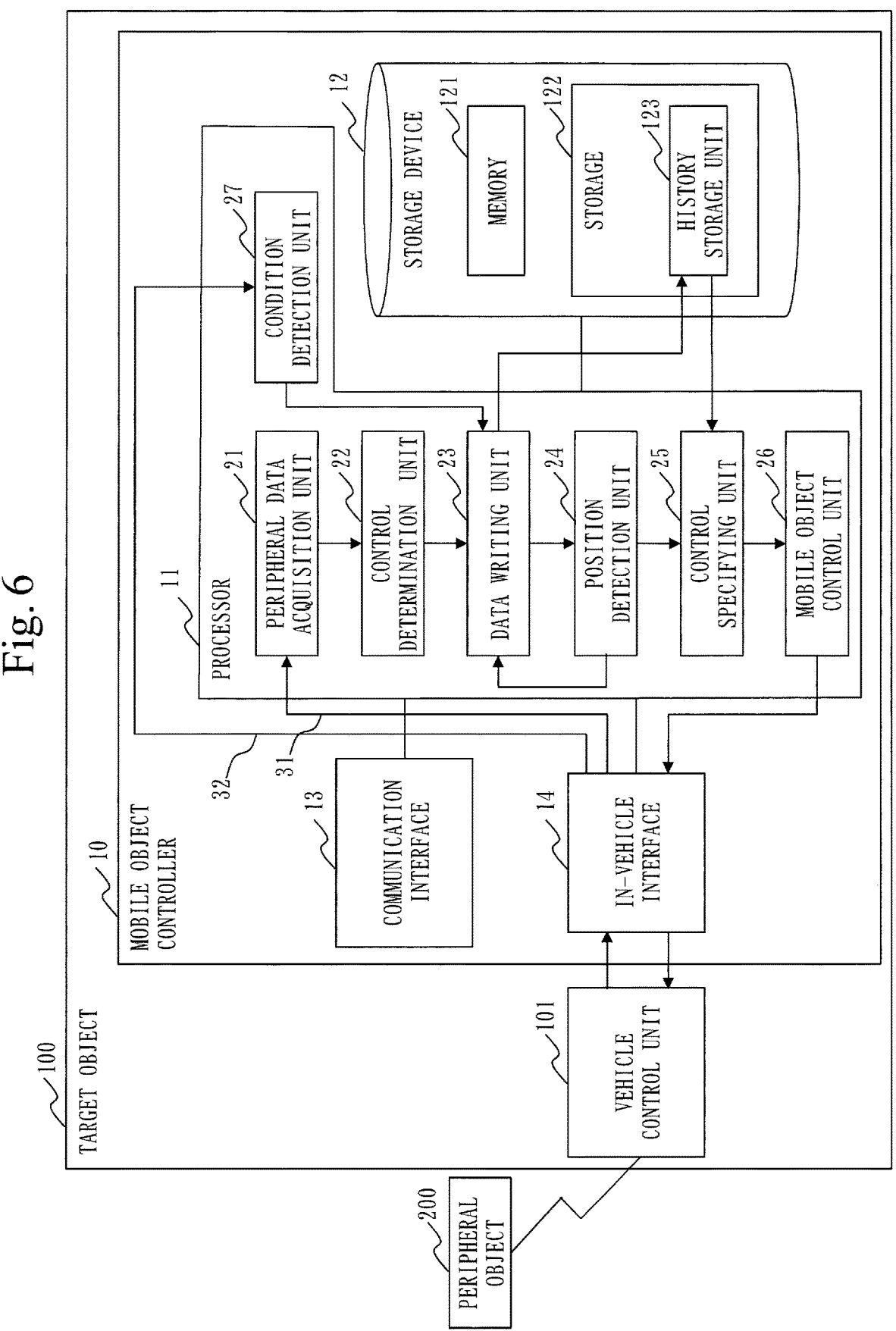
FIG. 6 is a configuration diagram of a mobile object controller 10 according to a second embodiment.

A configuration of a mobile object controller 10 according to the second embodiment will be described with reference to FIG. 6.

The mobile object controller 10 is different from the mobile object controller 10 illustrated in FIG. 1 in that a condition detection unit 27 is included as a functional component. The condition detection unit 27 is implemented by software or hardware in a similar manner to other functional components.

* Description of Operation *

A data accumulation process according to the second embodiment will be described with reference to FIG. 2.

A process of step S12 is the same as that in the first embodiment.

(Step S11: Peripheral Data Acquisition Process)

A peripheral data acquisition unit 21 obtains peripheral data 31 in a similar manner to the first embodiment. At this time, in a similar manner to the first embodiment, a position detection unit 24 detects the position of the target object 100 at the time when the peripheral data 31 is obtained.

Further, the condition detection unit 27 detects surrounding conditions 32 of the target object 100 at the time when the peripheral data 31 is obtained. The surrounding conditions 32 includes weather, whether or not the road surface is wet, whether or not it is congested, a time zone, whether or not a headlight is turned on, brightness, and the like. Specifically, the condition detection unit 27 detects the surrounding conditions 32 using a device such as a sensor connected via a vehicle control unit 101. The condition detection unit 27 writes the detected surrounding conditions 32 in a memory 121.

(Step S13: Data Writing Process)

A data writing unit 23 stores the peripheral data 31 obtained in step S11 in a history storage unit 123 in association with the position of the target object 100 at the time when the peripheral data 31 is obtained and the surrounding conditions 32 of the target object 100 at the time when the peripheral data 31 is obtained.

Figure 7:
FIG. 7 is a table illustrating information to be stored in a history storage unit 123 according to the second embodiment.

Specifically, the peripheral data 31 obtained in step S11 is written in the history storage unit 123 in association with the position of the target object 100 detected in step S11 and the surrounding conditions 32 of the target object 100 detected in step S11. In this case, as illustrated in FIG. 7, the data writing unit 23 writes the surrounding conditions 32 in the history storage unit 123 in addition to the information illustrated in FIG. 3.

A traveling control process according to the second embodiment will be described with reference to FIG. 4.

The processes of steps S23 to S25 are the same as those in the first embodiment.

(Step S21: Position Detection Process)

The position detection unit 24 detects the current position of the target object 100 in a similar manner to the first embodiment.

At this time, the condition detection unit 27 detects the current surrounding conditions 32 of the target object 100. A method for detecting the surrounding conditions 32 is the same as the process of step S11.

(Step S22: Data Search Process)

A control specifying unit 25 searches for, among the peripheral data 31 stored in the history storage unit 123, the peripheral data 31 stored in association with the current position of the target object detected in step S21 and the current surrounding conditions 32 of the target object 100 detected in step S21.

In the case where the control specifying unit 25 has found the peripheral data 31 stored in association with the current position of the target object, the process proceeds to step S23. On the other hand, in the case where the control specifying unit 25 has not found the peripheral data 31 stored in association with the current position of the target object, the process proceeds to step S25.

Effects of Second Embodiment

As described above, the mobile object controller 10 according to the second embodiment accumulates the peripheral data 31 as learning data of a control method at the position of the target object 100 and in the surrounding conditions 32 of the target object 100. Then, the control method is specified on the basis of the peripheral data 31 corresponding to the position and the surrounding conditions 32. Accordingly, control suitable for the surrounding conditions 32 can be performed.

* Other Configurations *

<Variation 3>

In the second embodiment, the mobile object controller 10 specifies the control method using only the peripheral data 31 corresponding to the position and the surrounding conditions 32. However, the mobile object controller 10 may specify the control method by weighting the peripheral data 31 corresponding to the position according to whether it corresponds to the surrounding conditions 32.

Figure 4:
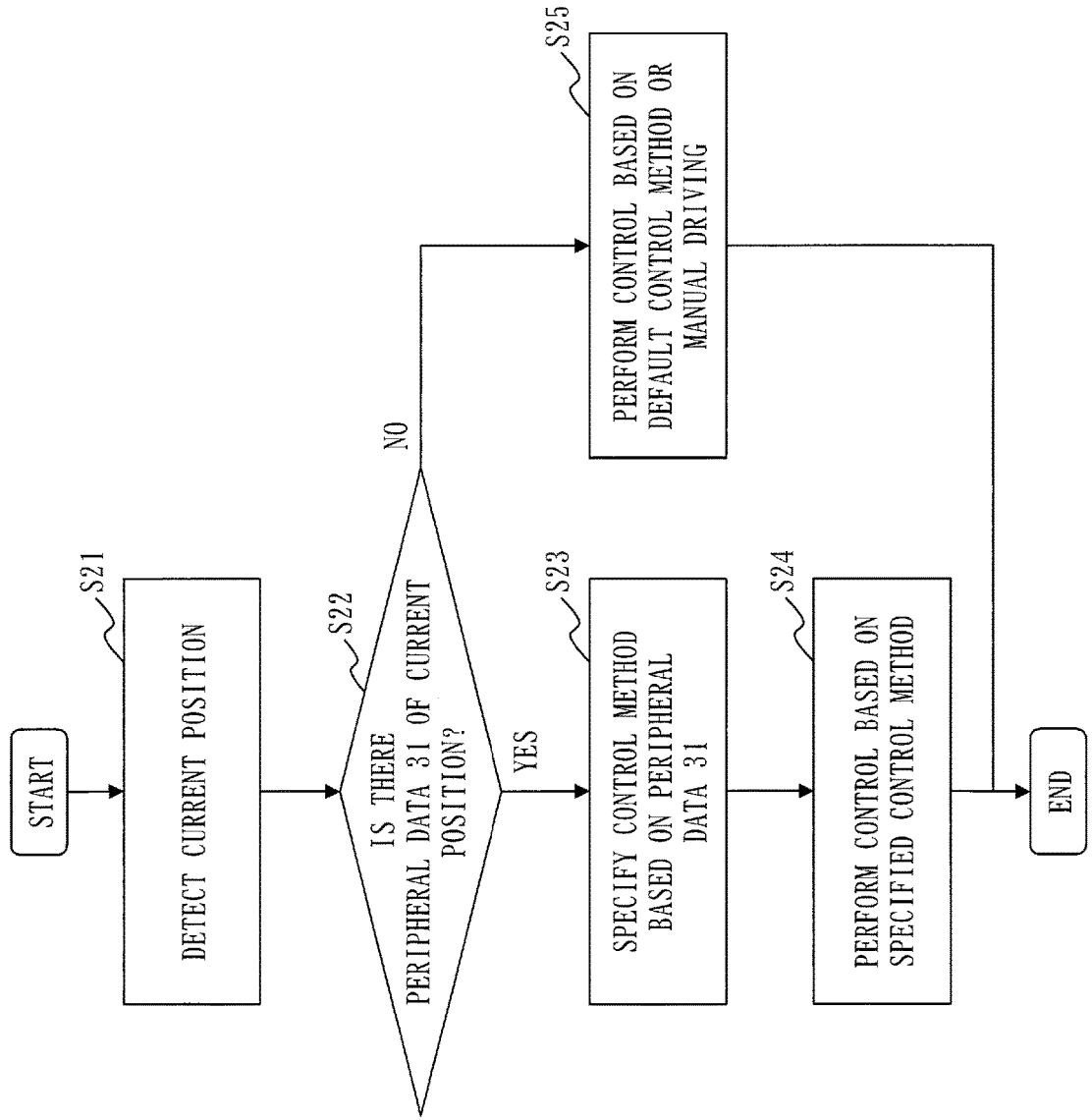
FIG. 4 is a flowchart of a traveling control process according to the first embodiment.

Specifically, in step S22 of FIG. 4, the control specifying unit 25 searches for, among the peripheral data 31 stored in the history storage unit 123, the peripheral data 31 stored in association with the current position of the target object detected in step S21 in a similar manner to the first embodiment. Then, in step S23 of FIG. 4, at the time of calculating an average value or a mode value, the control specifying unit 25 increases the weight of the peripheral data 31 corresponding to the surrounding conditions 32.

Accordingly, it becomes possible to perform control using a control method close to the control method based on the peripheral data 31 corresponding to the surrounding conditions 32 while considering all the peripheral data 31 at the position of the target object 100.

Third Embodiment

A third embodiment is different from the first and second embodiments in that peripheral data 31 transmitted from the peripheral object 200 is obtained. The different points will be described in the third embodiment, and descriptions of the same points will be omitted.

Note that the points different from the first embodiment will be described in the third embodiment. However, functions of the third embodiment can also be applied to the second embodiment.

* Description of Configuration *

Figure 8:
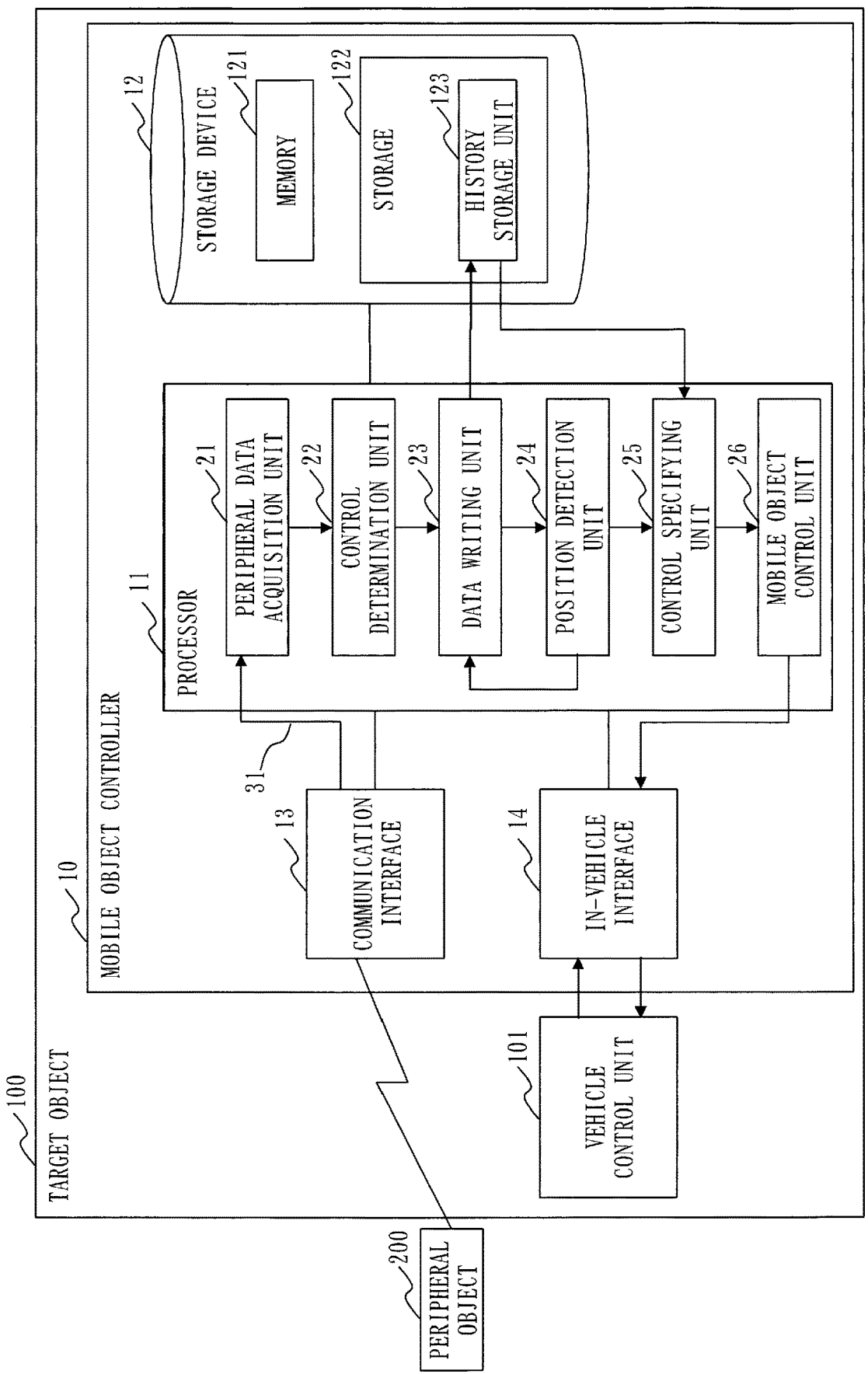
FIG. 8 is a configuration diagram of a mobile object controller 10 according to a third embodiment.

A configuration of a mobile object controller 10 according to the third embodiment will be described with reference to FIG. 8.

The mobile object controller 10 is different from the mobile object controller 10 illustrated in FIG. 1 in that a peripheral data acquisition unit 21 obtains peripheral data 31 via a communication interface 13.

\*\*\* Description of Operation \*\*\*

A data accumulation process according to the third embodiment will be described with reference to FIG. 2.

A process of step S13 is the same as that in the first embodiment.

(Step S11: Peripheral Data Acquisition Process)

The peripheral data acquisition unit 21 obtains the peripheral data 31.

Specifically, the peripheral data acquisition unit 21 receives the peripheral data 31 transmitted from the peripheral object 200 via the communication interface 13. That is, the peripheral data acquisition unit 21 obtains the peripheral data 31 detected by the peripheral object 200. At this time, the peripheral data 31 may include level information indicating a control level of the peripheral object 200.

Furthermore, in a similar manner to the first embodiment, a position detection unit 24 detects the position of a target object 100 at the time when the peripheral data 31 is obtained.

(Step S12: Control Determination Process)

In a case where the peripheral data 31 does not include the level information, in a similar manner to the first embodiment, a control determination unit 22 determines whether or not the control level is higher than a reference value from the peripheral data 31. On the other hand, in a case where the peripheral data 31 includes the level information, the control determination unit 22 determines whether or not the control level is higher than the reference value on the basis of the level information.

Effects of Third Embodiment

As described above, the mobile object controller 10 according to the third embodiment obtains the peripheral data 31 detected by the peripheral object 200 and transmitted from the peripheral object 200. Since the peripheral data 31 is detected by the peripheral object 200, the accuracy is high. Therefore, it becomes possible to perform control accurately. Moreover, the mobile object controller 10 does not require processing for detecting the peripheral data 31, whereby a processing amount can be reduced.

Fourth Embodiment

A fourth embodiment is different from the first to third embodiments in that it is determined whether or not to accumulate peripheral data 31 depending on a control state of a peripheral object 200. The different points will be described in the fourth embodiment, and descriptions of the same points will be omitted.

Note that the points different from the first embodiment will be described in the fourth embodiment. However, functions of the fourth embodiment can also be applied to the second and third embodiments.

\*\*\* Description of Operation \*\*\*

A data accumulation process according to the fourth embodiment will be described with reference to FIG. 2.

A process of step S13 is the same as that in the first embodiment.

(Step S11: Peripheral Data Acquisition Process)

A peripheral data acquisition unit 21 obtains peripheral data 31 in a similar manner to the first embodiment. At this time, in a similar manner to the first embodiment, a position detection unit 24 detects the position of the target object 100 at the time when the peripheral data 31 is obtained.

Further, the peripheral data acquisition unit 21 obtains, from the peripheral object 200, control data indicating whether the peripheral object 200 is controlled by a driver or autonomously controlled. Specifically, the peripheral data acquisition unit 21 communicates with the peripheral object 200 via a communication interface 13, and receives the control data from the peripheral object 200.

(Step S12: Control Determination Process)

In a similar manner to the first embodiment, a control determination unit 22 determines whether or not the control level of the peripheral object 200 is higher than a reference value. Further, the control determination unit 22 determines whether or not the control data obtained in step S11 indicates that the peripheral object 200 is controlled by a driver.

In a case where the control level is higher than the reference value and the control data indicates that the peripheral object 200 is controlled by a driver, the control determination unit 22 proceeds to step S13 in the process. Meanwhile, in the other cases, the control determination unit 22 terminates the process.

Effects of Fourth Embodiment

As described above, the mobile object controller 10 according to the fourth embodiment accumulates the peripheral data 31 only in the case where the peripheral object 200 is controlled by a driver. In a case where the peripheral object 200 is autonomously controlled, there may be a possibility that the peripheral object 200 is controlled on the basis of a default control method preset in the peripheral object 200. In that case, accumulation of the peripheral data 31 may result in learning of the default control method, whereby control may not be performed properly. The learning of the default control method can be suppressed with the mobile object controller 10 according to the fourth embodiment, whereby control can be performed properly.

\*\*\* Other Configurations \*\*\*

<Variation 4>

According to the fourth embodiment, the mobile object controller 10 accumulates the peripheral data 31 only in the case where the peripheral object 200 is controlled by a driver. However, in a similar manner to the first embodiment, the mobile object controller 10 may accumulate the peripheral data 31 in the case where the control level is higher than the reference value regardless of whether the peripheral object 200 is controlled by a driver or the peripheral object 200 is autonomously controlled. Then, the mobile object controller 10 may specify a control method by weighting the peripheral data 31 depending on whether the peripheral object 200 is controlled by a driver or the peripheral object 200 is autonomously controlled.

Figure 2:
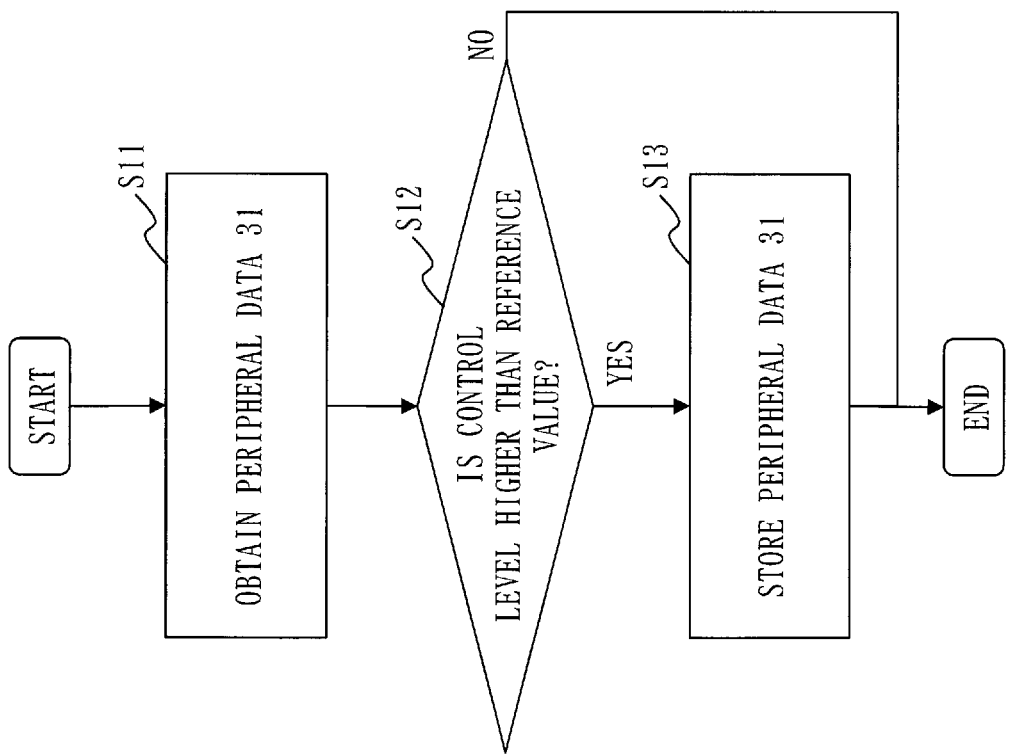
FIG. 2 is a flowchart of a data accumulation process according to the first embodiment.

Specifically, in step S12 of FIG. 2, the control determination unit 22 determines only whether or not the control level is higher than the reference value in a similar to the first embodiment. In step S13 of FIG. 2, a data writing unit 23 accumulates, in a history storage unit 123, the peripheral data 31 determined to have a control level higher than the reference value. At this time, the data writing unit 23 stores control data in the history storage unit 123 in association with the peripheral data 31. Then, in step S23 of FIG. 4, at the time of calculating an average value or a mode value, a control specifying unit 25 increases the weight of the peripheral data 31 associated with the control data indicating that the peripheral object 200 is controlled by a driver.

As a result, the control method can be specified while emphasizing the peripheral data 31 in the case of being controlled by a driver and concurrently considering the peripheral data 31 in the case of being autonomously controlled.

Fifth Embodiment

A fifth embodiment is different from the first to fourth embodiments in that peripheral data 31 is accumulated in the case where characteristics of an target object 100 and characteristics of a peripheral object 200 coincide with each other. The different points will be described in the fifth embodiment, and descriptions of the same points will be omitted.

Note that the points different from the first embodiment will be described in the fifth embodiment. However, functions of the fifth embodiment can also be applied to the second to fourth embodiments.

\*\*\* Description of Operation \*\*\*

A data accumulation process according to the fifth embodiment will be described with reference to FIG. 2.

A process of step S13 is the same as that in the first embodiment.

(Step S11: Peripheral Data Acquisition Process)

A peripheral data acquisition unit 21 obtains peripheral data 31 in a similar manner to the first embodiment. At this time, in a similar manner to the first embodiment, a position detection unit 24 detects the position of the target object 100 at the time when the peripheral data 31 is obtained.

Further, the peripheral data acquisition unit 21 obtains characteristic data indicating the characteristics of the peripheral object 200. The characteristics are specifications of a mobile object such as a size and displacement. Specifically, the peripheral data acquisition unit 21 obtains the characteristic data using a device such as a sensor connected via a vehicle control unit 101. For example, the peripheral data acquisition unit 21 may specify the characteristics from the form of the peripheral object 200 obtained by a camera to generate characteristic data. Alternatively, the peripheral data acquisition unit 21 communicates with the peripheral object 200 via a communication interface 13, and receives the characteristic data from the peripheral object 200.

(Step S12: Control Determination Process)

In a similar manner to the first embodiment, a control determination unit 22 determines whether or not the control level of the peripheral object 200 is higher than a reference value. Further, the control determination unit 22 determines whether or not the characteristics indicated by the characteristic data obtained in step S11 coincide with the characteristics of the target object 100.

In a case where the control level is higher than the reference value and the characteristics indicated by the characteristic data coincide with the characteristics of the target object 100, the control determination unit 22 proceeds to step S13 in the process. Meanwhile, in the other cases, the control determination unit 22 terminates the process.

Effects of Fifth Embodiment

As described above, the mobile object controller 10 according to the fifth embodiment accumulates only the peripheral data 31 of the peripheral object 200 whose characteristics coincide with those of the target object 100. A steering angle and a traveling position on the road may be different depending on the characteristics. Therefore, by specifying the control method on the basis of the peripheral data 31 of the peripheral object 200 whose characteristics coincide with those of the target object 100, it is possible to perform control properly.

\*\*\* Other Configurations \*\*\*

<Variation 5>

According to the fifth embodiment, the mobile object controller 10 accumulates only the peripheral data 31 of the peripheral object 200 whose characteristics coincide with those of the target object 100. However, in the case where its characteristics are different from those of the target object 100, the mobile object controller 10 may correct the peripheral data 31 and accumulate the corrected peripheral data 31.

As a specific example, in step S13 of FIG. 2, in the case where the sizes of the target object 100 and the peripheral object 200 are different, a data writing unit 23 corrects the steering angle and the like by the difference in size, and accumulates the peripheral data 31.

Accordingly, the peripheral data 31 of the peripheral object 200 whose characteristics are different from those of the target object 100 can also be used properly.

Sixth Embodiment

A sixth embodiment is different from the first to fifth embodiments in that peripheral data 31 accumulated in a history storage unit 123 is organized. The different points will be described in the sixth embodiment, and descriptions of the same points will be omitted.

Note that the points different from the first embodiment will be described in the sixth embodiment. However, functions of the sixth embodiment can also be applied to the second to fifth embodiments.

\*\*\* Description of Configuration \*\*\*

Figure 9:
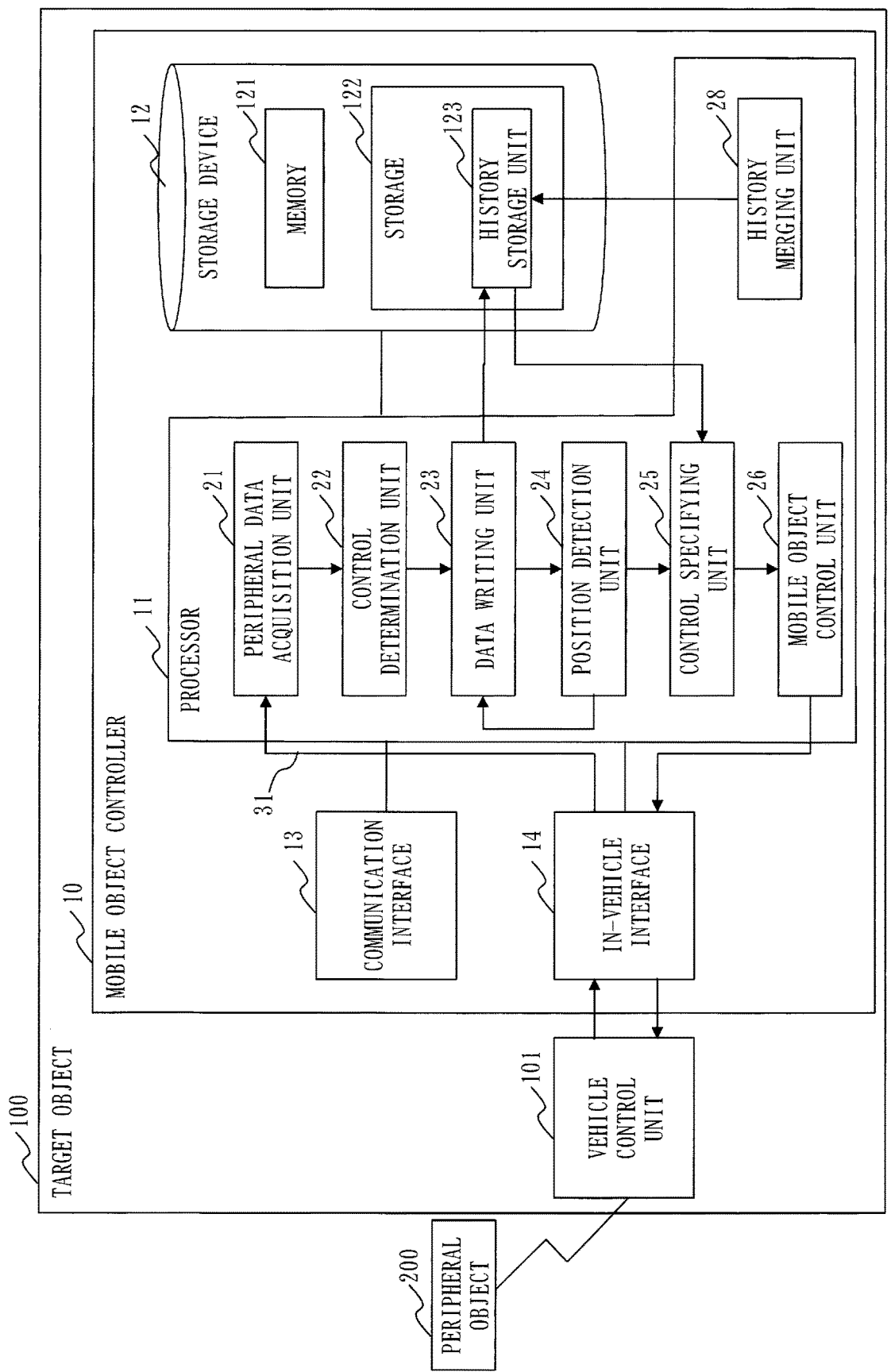
FIG. 9 is a configuration diagram of a mobile object controller 10 according to a sixth embodiment.

A configuration of a mobile object controller 10 according to the sixth embodiment will be described with reference to FIG. 9.

The mobile object controller 10 is different from the mobile object controller 10 illustrated in FIG. 1 in that a history merging unit 28 is included as a functional component. The history merging unit 28 is implemented by software or hardware in a similar manner to other functional components.

\*\*\* Description of Operation \*\*\*

Operation of the history merging unit 28 according to the sixth embodiment will be described with reference to FIG. 10.

Figure 10:
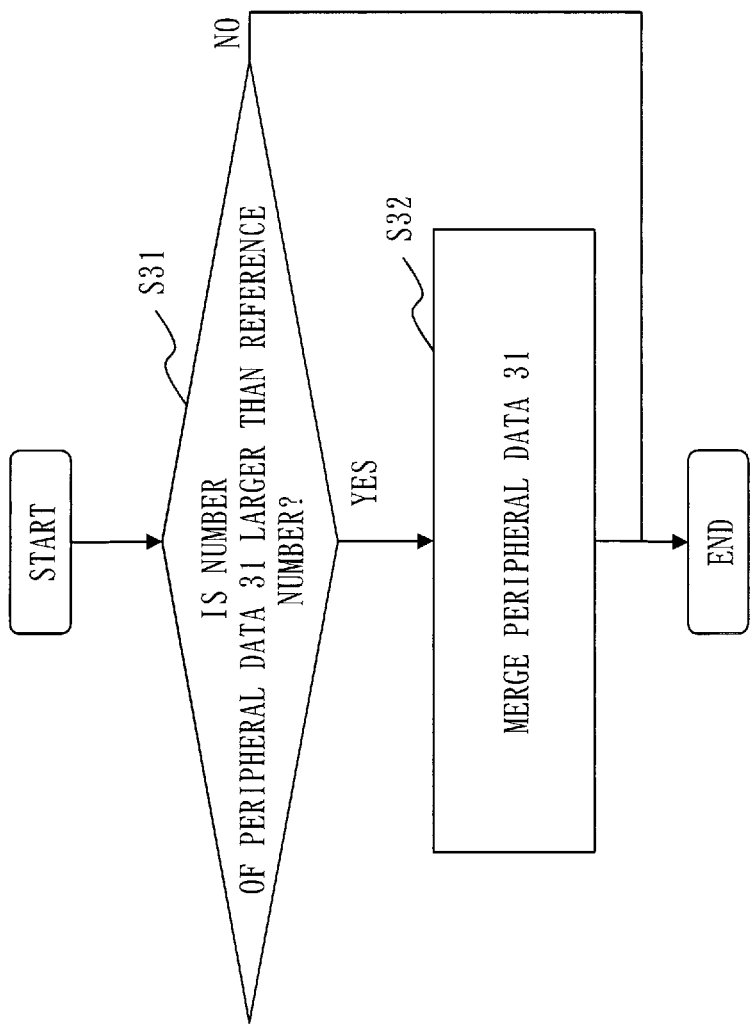
FIG. 10 is a flowchart illustrating operation of a history merging unit 28 according to the sixth embodiment.

The history merging unit 28 executes a process illustrated in FIG. 10 periodically or with an event serving as a trigger.

(Step S31: Number Determination Process)

The history merging unit 28 determines whether or not the peripheral data 31 accumulated in the history storage unit 123 is larger than a reference number.

In the case where the number of the peripheral data 31 is larger than the reference number, the history merging unit 28 proceeds to step S32 in the process. On the other hand, in the case where the number of the peripheral data 31 is equal to or lower than the reference number, the history merging unit 28 terminates the process.

(Step S32: Data Merging Process)

The history merging unit 28 merges the peripheral data 31 having the same content, which are accumulated in the history storage unit 123, to reduce the number thereof.

Specifically, the history merging unit 28 counts the number of the peripheral data 31 having the same content. Then, the history merging unit 28 deletes, leaving only one of the peripheral data 31 having the same content, the remaining peripheral data. The history merging unit 28 writes the counted number in the history storage unit 123 in association with the one peripheral data 31 that has been left.

Here, the peripheral data 31 having the same content indicates a record having the same position, speed, and steering angle in FIG. 3.

Effects of Sixth Embodiment

As described above, the mobile object controller 10 according to the sixth embodiment organizes the peripheral data 31 accumulated in the history storage unit 123. Accordingly, the data volume of the history storage unit 123 can be reduced. As a result, a process of step S22 in FIG. 4 and the like can be efficiently performed.

Seventh Embodiment

A seventh embodiment is different from the first to sixth embodiments in that, in a case where there is no peripheral data 31 stored in association with the position of a target object 100, a control method is specified using the peripheral data 31 having similar geographical conditions. The different points will be described in the seventh embodiment, and descriptions of the same points will be omitted.

Note that the points different from the first embodiment will be described in the seventh embodiment. However, functions of the seventh embodiment can also be applied to the second to sixth embodiments.

\*\*\* Description of Operation \*\*\*

A traveling control process according to the seventh embodiment will be described with reference to FIG. 11.

Processes of steps S41 to S44 are the same as the processes of steps S21 to S24 in FIG. 4. In addition, a process of step S46 is the same as the process of step S25 in FIG. 4.

(Step S45: Similar Data Search Process)

A control specifying unit 25 searches for, among the peripheral data 31 stored in a history storage unit 123, the peripheral data 31 stored in association with a position with geographical conditions similar to those at the current position of the target object 100 detected in step S21.

In the case where the control specifying unit 25 has found the peripheral data 31 stored in association with the current position of the target object, the process proceeds to step S43. On the other hand, in the case where the control specifying unit 25 has not found the peripheral data 31 stored in association with the current position of the target object, the process proceeds to step S46.

Similar geographical conditions indicate that road conditions, such as curves and hills, are similar. The control specifying unit 25 can specify the position with the geographical conditions similar to those at the position of the target object 100 by referring to map data.

Effects of Seventh Embodiment

As described above, in the case where there is no peripheral data 31 stored in association with the position of the target object 100, the mobile object controller 10 according to the seventh embodiment specifies the control method using the peripheral data 31 having similar geographical conditions. Accordingly, it becomes possible to perform control properly even at a place where traveling is performed for the first time.

\*\*\* Other Configurations \*\*\*

<Variation 6>

According to the seventh embodiment, the control specifying unit 25 searches for the peripheral data 31 at the position with similar geographical conditions. However, the control specifying unit 25 may search for the peripheral data 31 having similar geographical conditions and in the same time zone. Further, the control specifying unit 25 may search for the peripheral data 31 having similar surrounding conditions 32 described in the second embodiment.

The embodiments of the present invention have been described above. Some of those embodiments and variations may be implemented in combination. In addition, any one or some of them may be partially implemented. Note that the present invention is not limited to the embodiments and variations described above, and various modifications can be made as needed.

REFERENCE SIGNS LIST

10: mobile object controller, 11: processor, 12: storage device, 13: communication interface, 14: in-vehicle interface, 15: electronic circuit, 21: peripheral data acquisition unit, 22: control determination unit, 23: data writing unit, 24: position detection unit, 25: control specifying unit, 26: mobile object control unit, 27: condition detection unit, 28: history merging unit, 31: peripheral data, 100: target object, 101: vehicle control unit, 200: peripheral object.

The invention claimed is:

1. A mobile object controller, comprising:
processing circuitry to:
obtain peripheral data indicating a traveling state of a peripheral object traveling around a target object that is a mobile object,
determine whether or not a control level of the peripheral object is higher than a reference value from the obtained peripheral data,
store, in association with a position of the target object at a time when the peripheral data is obtained, the obtained peripheral data in a storage in a case where it is determined that the control level is higher than the reference value, and
specify a control method of the target object on a basis of, among the peripheral data stored in the storage, the peripheral data stored in association with a current position of the target object,
wherein the reference value is associated with a level of driving skill of a driver of the peripheral object.

2. A mobile object controller, comprising:
processing circuitry to:
obtain peripheral data indicating a traveling state of a peripheral object traveling around a target object that is a mobile object, and control data indicating whether the peripheral object is controlled by one of a driver and autonomous control;
store, in association with a position of the target object at a time when the peripheral data is obtained, the obtained peripheral data in a storage in a case where the control data indicates that the peripheral object is controlled by a driver; and
specify a control method of the target object on a basis of, among the peripheral data stored in the storage, the peripheral data stored in association with a current position of the target object.

3. The mobile object controller according to claim 1, wherein
the processing circuitry stores, in the storage, the peripheral data in association with the position of the target object at the time when the peripheral data is obtained and a surrounding condition of the target object at the time when the peripheral data is obtained, and
specifies the control method of the target object on a basis of the peripheral data stored in association with the current position of the target object and a current surrounding condition of the target object.

4. The mobile object controller according to claim 1, wherein
the processing circuitry obtains the peripheral data by receiving the peripheral data transmitted from the peripheral object.

5. The mobile object controller according to claim 1, wherein
the processing circuitry specifies a characteristic of the peripheral object, and
stores the peripheral data in the storage in a case where the specified characteristic coincides with a characteristic of the target object, or corrects the peripheral data according to the specified characteristic and then stores the peripheral data having been corrected in the storage.

6. The mobile object controller according to claim 1, wherein the processing circuitry merges the peripheral data having the same content, the peripheral data being stored in the storage.

7. The mobile object controller according to claim 1, wherein
in a case where the peripheral data stored in association with the current position of the target object is not stored in the storage, the processing circuitry specifies the control method of the target object on a basis of the peripheral data stored in association with a position with a geographical condition similar to a geographical condition of the current position of the target object.

8. A control method of a mobile object, the method comprising:
obtaining peripheral data indicating a traveling state of a peripheral object traveling around a target object that is a mobile object;
determining whether or not a control level of the peripheral object is higher than a reference value from the peripheral data;
storing the peripheral data having been obtained in a storage in association with a position of the target object at a time when the peripheral data is obtained in a case where it is determined that the control level is higher than the reference value; and
specifying a control method of the target object on a basis of, among the peripheral data stored in the storage, the peripheral data stored in association with a current position of the target object,
wherein the reference value is associated with a level of driving skill of a driver of the peripheral object.

9. A control method of a mobile object, the method comprising:
obtaining peripheral data indicating a traveling state of a peripheral object traveling around a target object that is a mobile object, and control data indicating whether the peripheral object is controlled by one of a driver and autonomous control;
storing the peripheral data having been obtained in a storage in association with a position of the target object at a time when the peripheral data is obtained in a case where the control data indicates that the peripheral object is controlled by a driver; and
specifying a control method of the target object on a basis of, among the peripheral data stored in the storage, the peripheral data stored in association with a current position of the target object.

10. A non-transitory computer readable medium storing a mobile object control program causing a computer to perform:
a peripheral data acquisition process to obtain peripheral data indicating a traveling state of a peripheral object traveling around a target object that is a mobile object;
a control determination process to determine whether or not a control level of the peripheral object is higher than a reference value from the peripheral data obtained by the peripheral data acquisition process;
a data writing process to store, in association with a position of the target object at a time when the peripheral data is obtained, the peripheral data obtained by the peripheral data acquisition process in a storage in a case where the control determination process determines that the control level is higher than the reference value; and
a control specifying process to specify a control method of the target object on a basis of, among the peripheral data stored in the storage, the peripheral data stored in association with a current position of the target object,
wherein the reference value is associated with a level of driving skill of a driver of the peripheral object.

11. A non-transitory computer readable medium storing a mobile object control program causing a computer to perform:
a peripheral data acquisition process to obtain peripheral data indicating a traveling state of a peripheral object traveling around a target object that is a mobile object, and control data indicating whether the peripheral object is controlled by one of a driver and autonomous control;
a data writing process to store, in association with a position of the target object at a time when the peripheral data is obtained, the peripheral data obtained by the peripheral data acquisition process in a storage in a case where the control data indicates that the peripheral object is controlled by a driver; and
a control specifying process to specify a control method of the target object on a basis of, among the peripheral data stored in the storage, the peripheral data stored in association with a current position of the target object.

* * * * *